(12) United States Patent
Wang et al.

(10) Patent No.: US 6,434,197 B1
(45) Date of Patent: Aug. 13, 2002

(54) MULTI-FUNCTIONAL TRANSCODER FOR COMPRESSED BIT STREAMS

(75) Inventors: Limin Wang; Ajay Luthra, both of San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/226,796

(22) Filed: Jan. 7, 1999

(51) Int. Cl.⁷ ................................................. H04N 7/18
(52) U.S. Cl. .......................... 375/240.29; 375/240.28; 375/240.26; 375/240.03
(58) Field of Search ....................... 375/240.01–240.29

(56) References Cited

U.S. PATENT DOCUMENTS

| | | | |
|---|---|---|---|
| 4,212,028 A | | 7/1980 | Drewery |
| 4,550,335 A | | 10/1985 | Powers |
| 5,327,235 A | | 7/1994 | Richards |
| 5,400,082 A | | 3/1995 | Kamiya |
| 5,428,397 A | | 6/1995 | Lee et al. |
| 5,477,397 A | | 12/1995 | Naimpally et al. |
| 5,512,956 A | | 4/1996 | Yan |
| 5,544,266 A | | 8/1996 | Koppelmans et al. |
| 5,610,942 A | | 3/1997 | Chen et al. |
| 5,617,142 A | | 4/1997 | Hamilton |
| 5,619,733 A | | 4/1997 | Noe et al. |
| 5,737,032 A | | 4/1998 | Stenzel et al. |
| 5,781,184 A | | 7/1998 | Wasserman et al. |
| 5,805,224 A | | 9/1998 | Keesman et al. |
| 5,923,814 A | | 7/1999 | Boyce |
| 5,933,500 A | | 8/1999 | Blatter et al. |
| 5,953,506 A | * | 9/1999 | Kalra et al. ............. 395/200.61 |
| 6,058,143 A | * | 5/2000 | Golin ......................... 375/240 |
| 6,167,084 A | | 12/2000 | Wang et al. |
| 6,226,328 B1 | * | 5/2001 | Assuncao .............. 375/240.26 |

FOREIGN PATENT DOCUMENTS

EP             0 627 854         12/1994

OTHER PUBLICATIONS

Boyce, J.M., "Data Selection Strategies for Digital VCR Long Play Mode," *Digest of Technical Papers for the International Conference on Consumer Electronics*, New York, Jun. 21, 1994. pp. 32–33.
G. Keesman, et al., "Transcoding of MPEG bitstreams," Signal Processing: Image Communication, vol. 8, pp. 481–500, 1996.
Staff of Cable Television Laboratories Inc., "Digital TV Solutions," From the Labs: Cable World, Feb. 1, 1999.
Gebeloff,Rob., "The Missing Link," http://www.talks.com/interactive/misslink–x.html.
Björk et al. "Transcoder Architectures for Video Coding," *IEEE Transactions on Consumer Electronics*, vol. 44, No. 1, Feb. 1998, pp. 88–98.

* cited by examiner

*Primary Examiner*—Andy Rao
(74) *Attorney, Agent, or Firm*—Barry R. Lipsitz; Douglas M. McAllister

(57) ABSTRACT

A method and apparatus for transcoding digital video data, for example, at the headend of a cable or satellite television network. A generic multi-functional transcoder architecture has a "post-pre-processing engine" that provides a number of processing functions for implementing desired format conversions according to a user selection signal or an automatically generated selection signal. The processing functions can change frame size, frame rate, color space sampling format, interlaced or progressive scan format, resolution, and provide noise/deblocking filtering, for example. The system also allows the control of several transcoders to convert several bit streams with different formats into corresponding bit streams with a common format. Furthermore, the transcoder avoids the need for motion estimation.

34 Claims, 10 Drawing Sheets

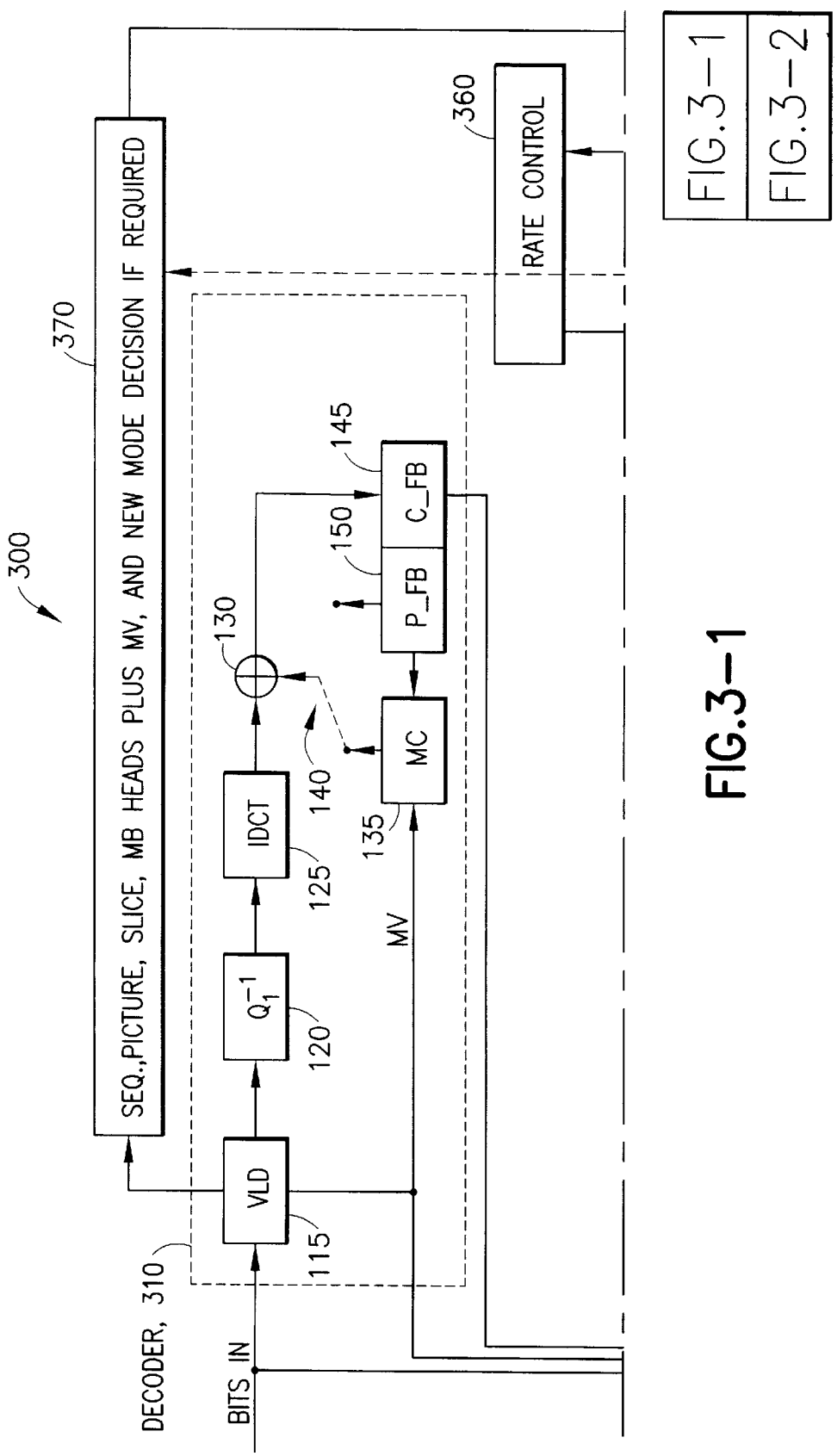

MULTI-FUNCTIONAL TRANSCODER FOR COMPRESSED BIT STREAMS

BACKGROUND OF THE INVENTION

The present invention relates to a method and apparatus for transcoding digital video data, for example, at the headend of a cable or satellite television network.

The transmission of digital video data via broadband communication systems such as cable television or satellite television networks has become increasingly popular. Digital decoders, e.g. set-top boxes, are provided in consumers' homes for use in receiving the digital video signals and processing the signals in a format that is suitable for display on a television, video display terminal, or the like.

In general, source video sequences can be of any format, e.g., in terms of spatial resolution, frame rate, frame size, color sampling format, interlaced or progressive scan format, bit rate, resolution (e.g., high-definition or standard definition), or amount and type of noise filtering. Additionally, the source video sequences can be pre-encoded at any rate, and with a constant bit rate (CBR) or variable bit rate (VBR).

For many applications, however, the pre-compressed bitstreams must correspond with only specific allowable, or otherwise desirable, video formats and rates. Accordingly, it is often necessary to change the format or other characteristics of the video data prior to communicating it to a set-top box and/or some intermediate point in a network.

For example, the data may be originally obtained via a storage medium or transmission point in a format that is not compatible with, or optimally suitable for, the set-top box, headend equipment, channel capacity, or other system limitation or property.

In the past, the required format conversion was achieved by decompressing the pre-compressed data to the pixel domain, performing the required format or bit rate conversion, then re-compressing the data, including motion compensation and motion estimation processing for interframe coded data, for transmission. However, this approach is undesirable due to the extensive computational requirements, in particular, due to motion estimation. Additionally, the different required format conversions are not provided in an integrated package.

An article by N. Björk et al., entitled "Transcoder Architectures for Video Coding", IEEE Transactions on Consumer Electronics, Vol. 44, No. Feb. 1, 1998, discusses the possibility of using a downsampling filter for resolution reduction transcoding with H.263 data for low bit rate communications. However, the article does not discuss a generic multi-functional transcoder that allows the selection of one or more of a variety of format-modifying processes.

Accordingly, it would be desirable to provide a generic, integrated transcoder architecture which is able to convert a pre-compressed digital video bit stream into another bit stream at a specific bit rate and format. The system should be compatible with MPEG-2 and other digital video standards. The system should provide the capability for modification of spatial resolution, frame rate, frame size, color sampling format, interlaced or progressive scan format, bit rate, resolution, and/or amount and type of noise filtering, in an integrated transcoder architecture.

The system should allow the selection of one or more of several available processing functions according to a user selection signal or an automatically generated selection signal, e.g., that is responsive to detected characteristics of the received pre-compressed bit stream, or some other criteria, including a default setting.

The system should allow the control of several transcoders to convert several bit streams with different formats into corresponding bit streams with a common format.

The system should provide re-use of motion vectors obtained from decoding for re-encoding, with optional motion estimation refinement during re-encoding as required.

The system should avoid the complexity introduced by motion estimation in a transcoder.

The present invention provides a system having the above and other advantages.

SUMMARY OF THE INVENTION

The present invention relates to a method and apparatus for transcoding digital video data, for example, at the headend of a cable or satellite television network.

A method for transcoding compressed digital video data includes the step of partially decompressing first compressed digital video data to provide first intermediate reconstructed data having an associated first format. The format may include one or more of the following characteristics: frame size, frame rate, color space sampling format (i.e., sampling ratio), interlaced or progressive scan, resolution (e.g., high-definition or standard definition), and noise filtering status (e.g., whether the data is noise filtered or not, and if so, the amount and type of noise filtering).

A post-pre-processing engine is provided that has a plurality of different available processing functions for achieving any of the above format changes. The term "post-pre-processing" indicates that processing occurs after decoding, but before re-encoding in the transcoder.

A first selection signal is provided for selecting at least one of the processing functions. The selection signal may be provided by a user, or automatically generated, for example, by reading the first compressed digital video data and determining its format. The detected format may then be compared to a desired format, e.g., based on data stored in a memory, to determine if a change is required.

The first intermediate reconstructed data is processed according to the selected processing function to provide corresponding first modified intermediate reconstructed data having a first modified format that is different than the first format. The first modified intermediate reconstructed data is then compressed to provide first modified compressed digital video data with the first modified format.

For example, the post-pre-processing engine may be provided at the headend of a cable or satellite television network, in which case the first modified compressed digital video data is transmitted to a decoder population via optical fiber, co-axial cable, and/or a satellite link.

The first compressed digital video data may also be processed to change its bit rate according to a second selection signal. For example, a relatively high bit rate may be used for premium television programming, while the bit rate is reduced for standard programming services. The bit rate may also be changed from variable to fixed, or from fixed to variable.

One of the available processing functions may process the first intermediate reconstructed data with a noise-reduction/deblocking filter, such as a fixed or adaptive filter. The noise filtering condition of the data is considered to be a component of the data's format. Thus, data that is not noise filtered has one format, while the same data after noise filtering has another format. The first intermediate reconstructed data may be delayed to provide noise-reduction filtering of a current image region using a future image region.

For example, the current image region and the future image region may be in different video frames, or in a common video frame, where the future image region follows the current image region according to a display scan sequence of the first intermediate reconstructed data.

The current image region and the future image region may be provided as respective macroblocks.

One of the available processing functions may provide the first modified intermediate reconstructed data with a different resolution (e.g., standard definition vs. high-definition) than that of the first intermediate reconstructed data.

One of the available processing functions may either (a) provide the first modified intermediate reconstructed data with an interlaced scan format when the first intermediate reconstructed data has a progressive scan format, or (b) provide the first modified intermediate reconstructed data with a progressive scan format when the first intermediate reconstructed data has an interlaced scan format.

One of the available processing functions may provide the first modified intermediate reconstructed data with a color space sampling format that is different than that of the first intermediate reconstructed data.

One of the plurality of different available processing functions may provide the first modified intermediate reconstructed data with a frame size or rate that is different than that of the first intermediate reconstructed data.

Additionally, several transcoders with post-pre-processing engines may be provided for converting different bit streams with different formats to a common format, e.g., prior to transmission to a decoder population.

The method may include the further steps of: obtaining motion vector data from the first intermediate reconstructed data, e.g., at the decoder of a transcoder, and providing the motion vector data for use in compressing the first modified intermediate reconstructed data, e.g., at the encoder of the transcoder. The motion vector data may be refined as required for use in the compressing step. With this technique, the transcoder avoids the need to re-generate motion vectors from scratch in the encoder of a transcoder, thereby significant reducing memory and computational requirements.

A corresponding apparatus is presented.

BRIEF DESCRIPTION OF THE DRAWINGS

FIG. 7($b$) illustrates filtering of pixels in the current block of FIG. 7($a$) using pixels in a neighboring block in accordance with the present invention.

DETAILED DESCRIPTION OF THE INVENTION

The present invention relates to a method and apparatus for transcoding digital video data, for example, at the headend of a cable or satellite television network.

Figure 1:
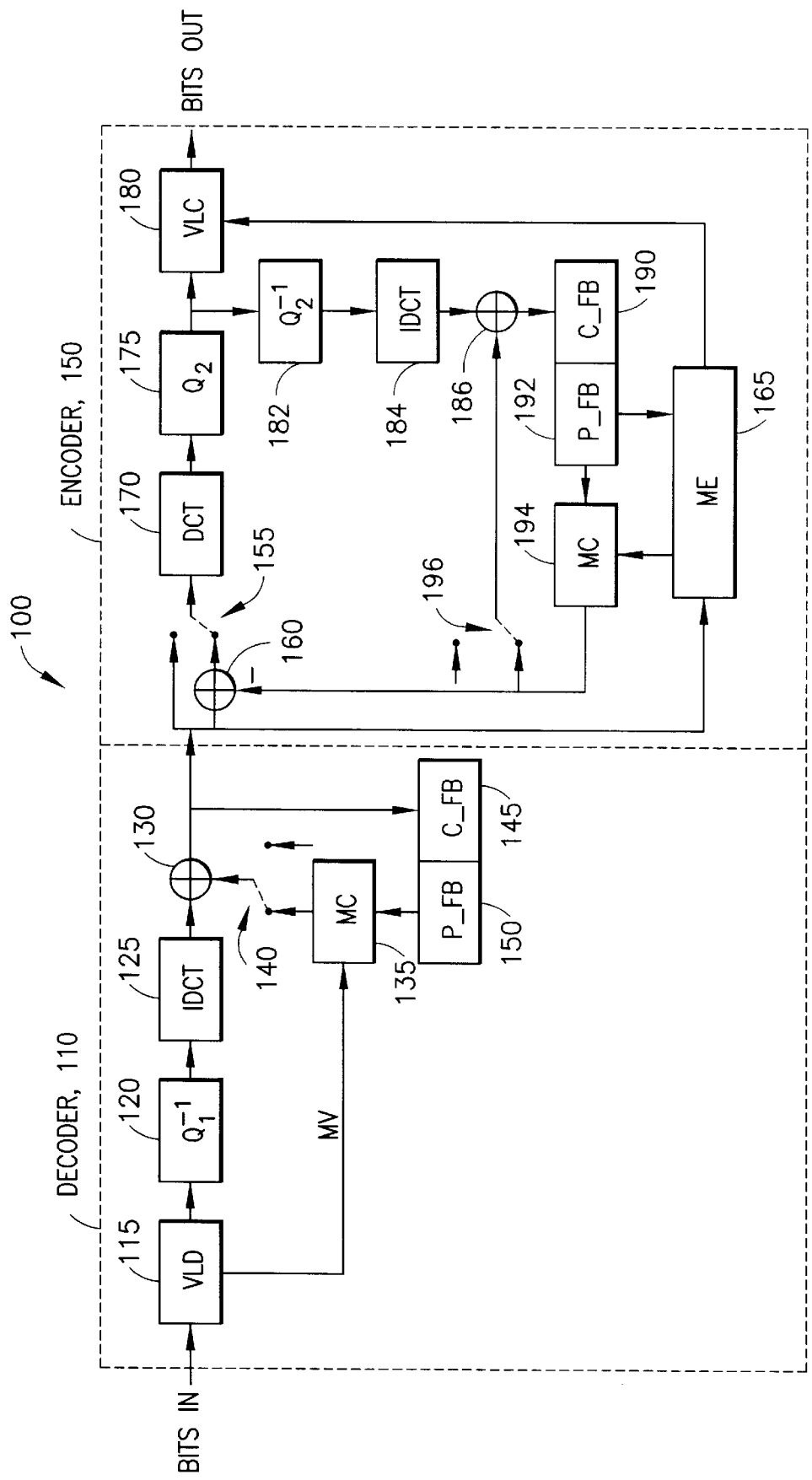
FIG. 1 illustrates a prior art transcoder.

FIG. 1 illustrates a prior art transcoder. A straightforward transcoder for an MPEG bitstream can simply be a cascaded MPEG decoder and encoder. The cascaded transcoder first decodes a compressed bitstream, e.g. that is obtained from a library or transmission source, to obtain a reconstructed video sequence. The reconstructed video sequence is then re-encoded to obtain a different compressed bitstream that is suitable for transmission, e.g., to a decoder population.

In particular, the transcoder 100 includes a decoder 110 and an encoder 150. A pre-compressed video bitstream is input to a Variable Length Decoder (VLD) 115. A dequantizer function 120 processes the output of the VLD 115 using a first quantization step size, $Q_1$. An Inverse Discrete Cosine Transform (IDCT) function 125 processes the output of the inverse quantizer 120 to provide pixel domain data to an adder 130. This data is summed with either a motion compensation difference signal from a Motion Compensator (MC) 135 or a null signal, according to the position of a switch 140.

The code mode for each input macroblock (MB), either intra or inter mode, embedded in the input pre-compressed bit stream, is provided to the switch 140. The output of the adder 130 is provided to the encoder 150 and to a Current Frame Buffer (C_FB) 145 of the decoder 110. The MC function 135 uses data from the current FB 145 and from a Previous Frame Buffer (P_FB) 150 along with motion vector (MV) data from the VLD 115.

In the encoder 150, pixel data is provided to an intra/inter mode switch 155, an adder 160, and a Motion Estimation (ME) function 165. The switch 155 selects either the current pixel data, or the difference between the current pixel data and pixel data from a previous frame, for processing by a Discrete Cosine Transform (DCT) function 170, quantizer 175, and Variable Length Coding (VLC) function 180. The output of the VLC function 180 is a bitstream that is transmitted to a decoder. The bitstream includes Motion Vector (MV) data from the ME function 165.

The bit output rate of the transcoder is adjusted by changing $Q_2$.

In a feedback path, processing at an inverse quantizer 182 and an inverse DCT function 184 is performed to recover the pixel domain data. This data is summed with motion compensated data or a null signal at an adder 186, and the sum thereof is provided to a Current Frame Buffer (C_FB) 190. Data from the C_FB 190 and a P_FB 192 are provided to the ME function 165 and a MC function 194. A switch 196 directs either a null signal or the output of the MC function 194 to the adder 186 in response to an intra/inter mode switch control signal.

However, this approach is undesirable due to the extensive computational requirements incurred when fully decompressing the pre-compressed data to the pixel domain, and fully re-compressing the intermediate reconstructed video frames, including motion compensation and estimation processing for the inter-frame coded data. Additionally, the implementation costs of the cascaded transcoder is relatively high due to the need for one full MPEG decoder and one full MPEG encoder.

Computer simulation results have indicated that if the picture type for each frame is maintained during transcoding, the motion vectors decoded from the decoder can be used for motion compensation in the encoder without significantly impairing the perceptual quality of the resulting image. This indicates that motion estimation, the most expensive operation, can be removed from the cascaded transcoder, as discussed in connection with FIG. 2, below.

Figure 2:
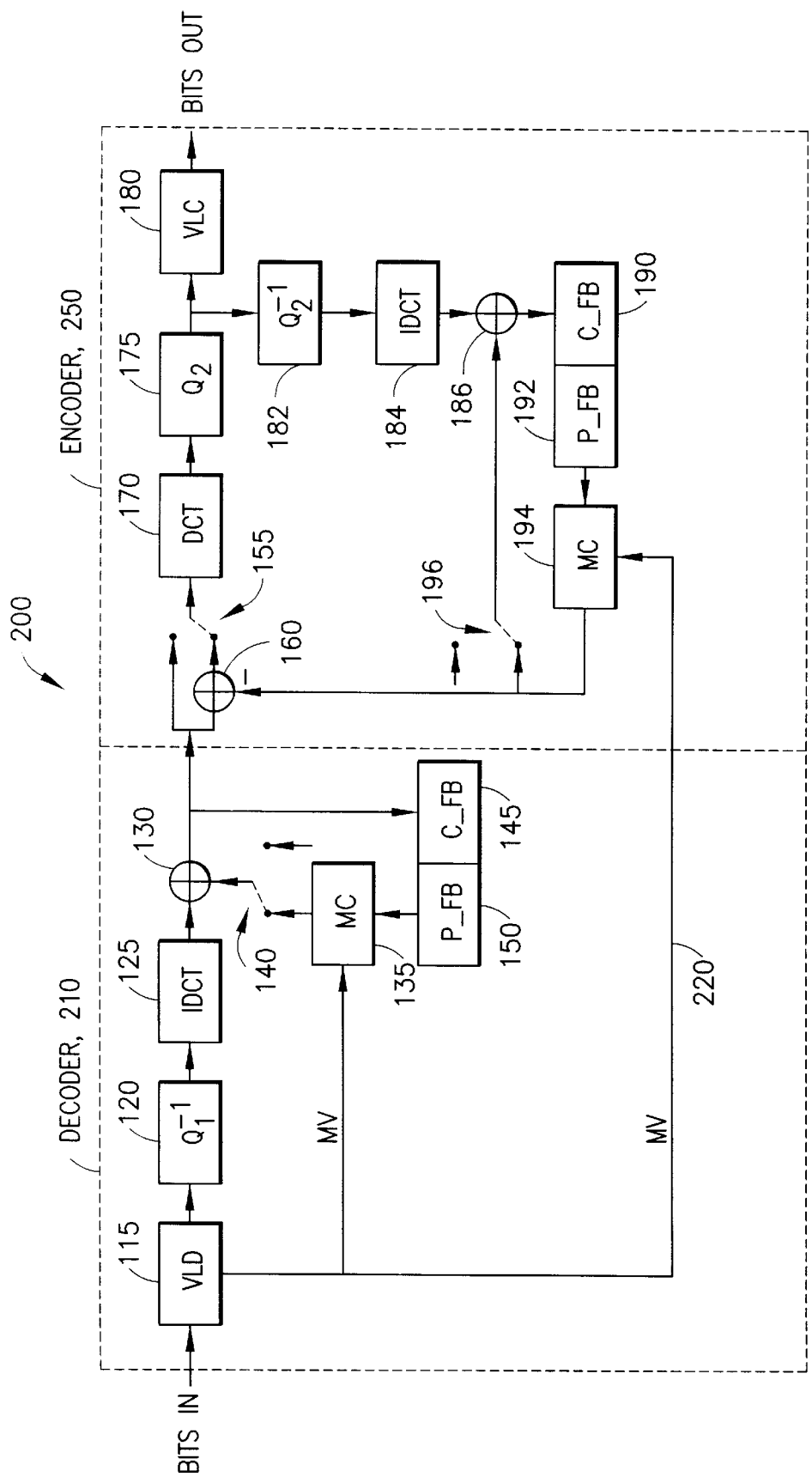
FIG. 2 illustrates a transcoder wherein motion estimation has been removed from the encoder, in accordance with the present invention.

FIG. 2 illustrates a transcoder wherein motion estimation has been removed from the encoder, in accordance with the present invention. Like-numbered elements correspond to the elements of FIG. 1. The transcoder 200 includes a decoder 210 and an encoder 250. Here, the motion vectors from the VLD 115 are provided to the MC 194 in the encoder 250. The transcoder architecture of FIG. 2 will therefore generate a new bitstream and a new bit rate, but with the same video format as the pre-compressed bitstream.

Figures 2, 3:
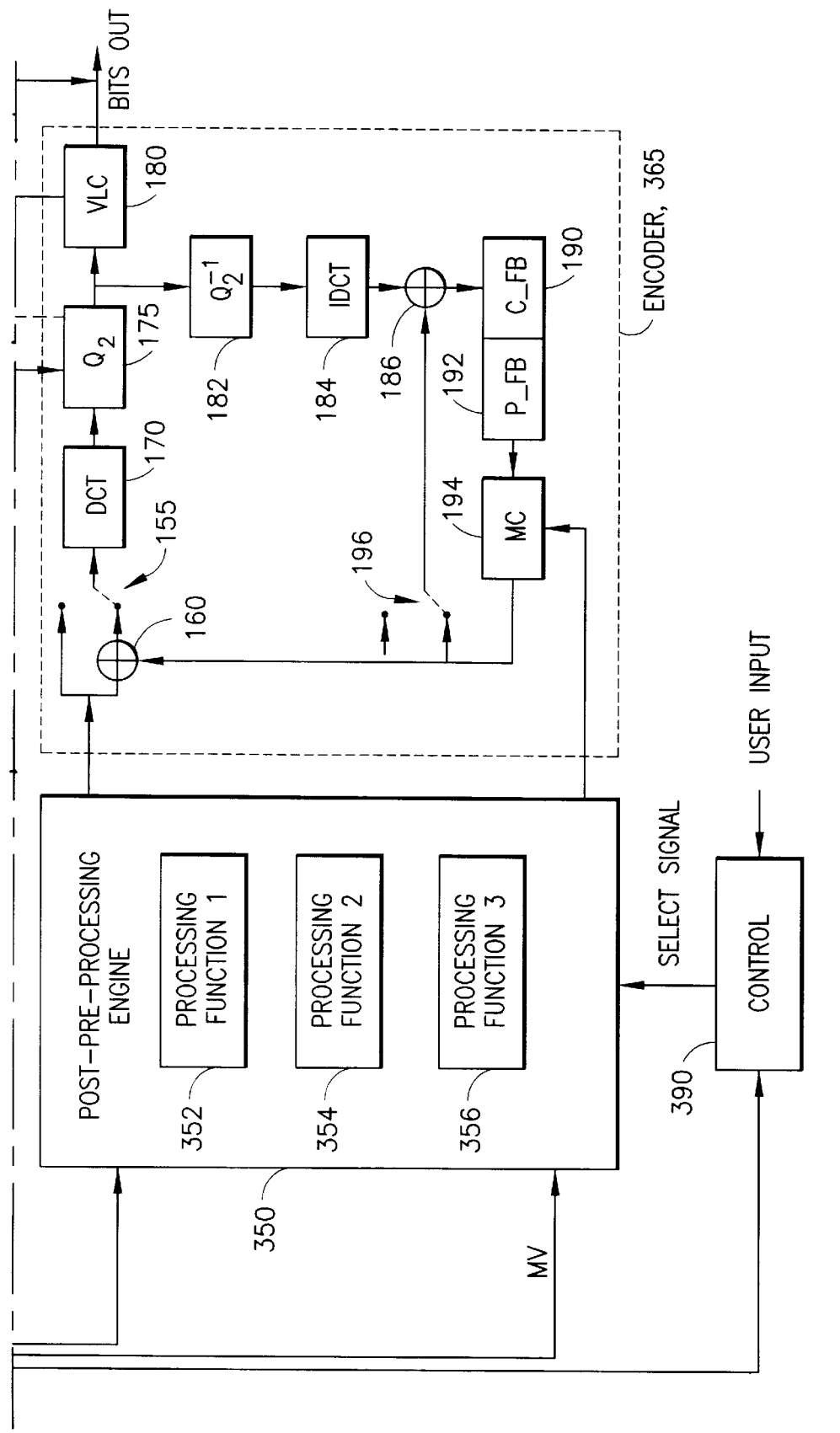
FIG. 3 illustrates a transcoder with a post-pre-processing engine in accordance with the present invention.

FIG. 3 illustrates a generic transcoder with a post-pre-processing engine in accordance with the present invention. Like-numbered elements correspond to the elements of FIG. 1.

The transcoder 300 includes a decoder 310 and an encoder 365. A copy function 370 is provided for copying information from the incoming bitstream to the outgoing bitstream. This information may include sequence, picture, splice, and macroblock headers, along with motion vectors, and data designating a new mode decision, if required. Additionally, the quantization level $Q_2$ used by the quantizer 175 may be provided by the function 370 to the output bitstream.

A rate control function 360 receives information from the VLC 180 indicating the bit rate of the output bitstream and determines a corresponding quantization level for maintaining the bit rate within a desired constraint. The rate control function 360 provides a corresponding control signal to the quantizer 175 to set a corresponding quantization level (e.g., step sizes). In this manner, a desired constant bit rate, or a variable bit rate with minimum and maximum boundaries may be provided.

The post-pre-processing engine 350 includes a number of processing functions, e.g., 352, 354, and 356, and may provide a variety of processing functions, including:

1) Converting of bit rate to meet a rate requirement, e.g., from a high to a low rate, from CBR to VBR, and so forth;
2) Filtering of the intermediate reconstructed frames for better picture quality, especially for low bit rate applications; and
3) Converting of video formats, e.g., from high to low resolution, from interlaced scan to progressive scan, from high definition to standard definition, from CCIR Recommendation 601 resolution to Half Horizontal Resolution (HHR), from 4:4:4 to 4:2:2 color sampling format, from 4:2:2 to 4:2:0 color sampling format, and so forth. Additionally, changes in the frame rate and/or frame size may be provided.

A control 390 provides a select signal to the post-pre-processing engine 350 to select one or more of the available processing functions 352, 354, 356. Processing by the processing functions 352, 354, 356 may occur serially or in parallel. While three processing functions are shown, fewer or more may be provided. The control 390 may be responsive to a user input, e.g., entered via a keyboard or the like, and/or information recovered from the bit stream. The user input may alternatively be provided from a remote location. In this manner, multiple generic transcoders may be deployed in the field, and the specific processing functions selected or revised at a later date.

The processing functions 352, 354, 356 may comprise fixed filters that perform the different processing functions. In this case, the select signal activates the appropriate filter(s).

Alternatively, the post-pre-processing engine may have a filter that can be configured to embody the different processing functions, e.g., using adjustable coefficients. In this case, the selection signal causes the filter to be configured with the appropriate coefficients or other parameters.

Generally, the processing functions 352, 354, 356 in the post-pre-processing engine 350 may be implemented using any known hardware, firmware, and/or software. Additionally, processing by the processing functions 352, 354, 356 may occur serially or in parallel.

The control 390 may also be responsive to the bit stream received at the transcoder 300. In particular, the control may recover data, e.g., header information, from the bit stream that identifies format characteristics of the bit stream. For example, the control 390 may be programmed to convert the color sampling ratio from 4:2:2 to 4:2:0 for those bit streams with the 4:2:2 ratio. Then, the control 390 may detect the sampling ratio of the received bit stream and perform the conversion only when necessary.

Generally, the control need not be responsive to the bit stream to implement noise reduction filtering.

In this manner, the transcoder 300 can receive data having a variety of different formats, yet the output data will always have the desired, specified format.

The control 390 may also be programmed to provide a select signal to the pre-post-processing engine to provide a default output format.

Figure 4:
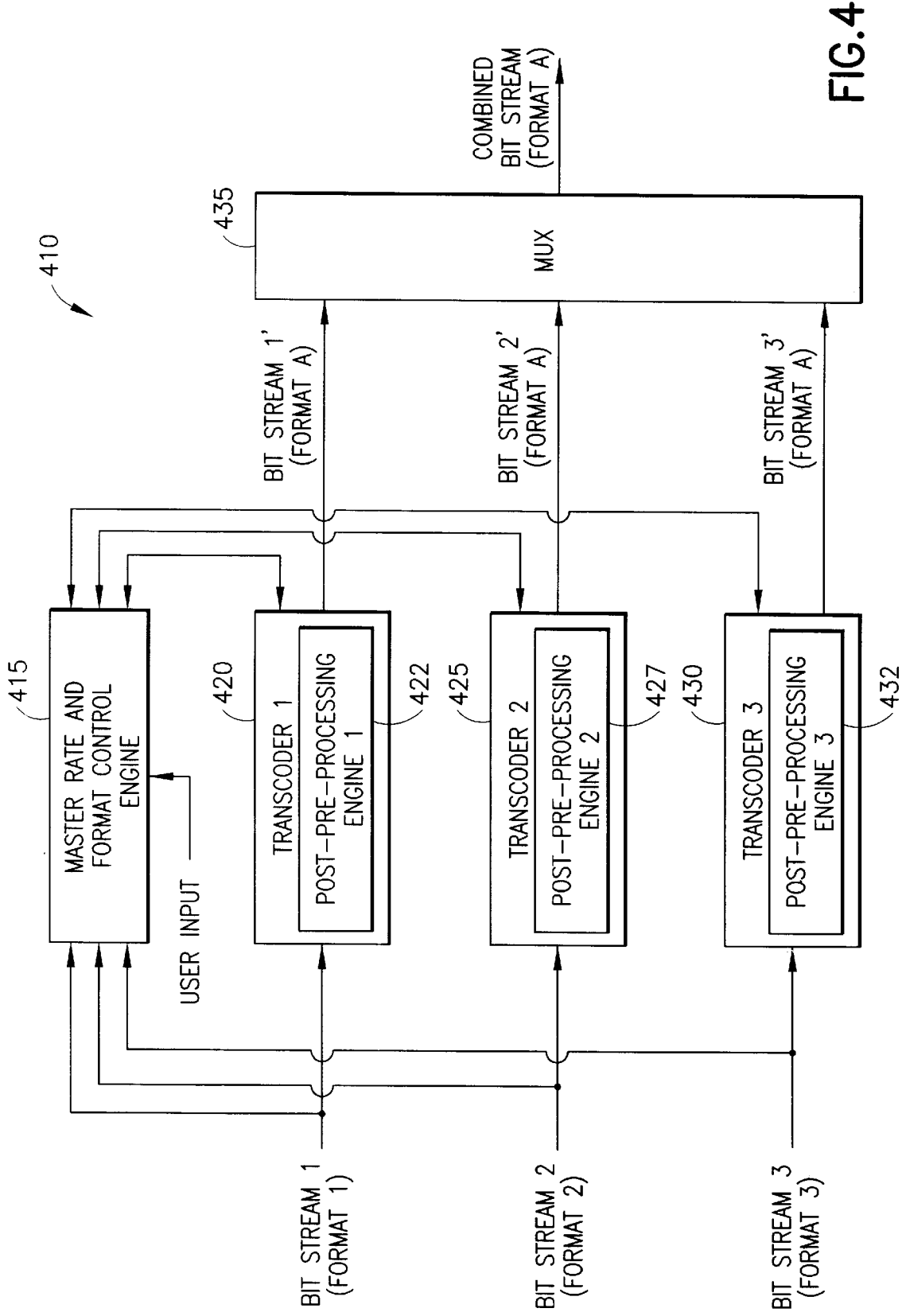
FIG. 4 illustrates a plurality of transcoders with post-pre-processing engines in accordance with the present invention.

Moreover, as shown in FIG. 4, a number of the transcoders may be used at the same time for processing data from different programming sources which may have different formats. The corresponding output formats can be made uniform and therefore suitable for use, e.g., by a decoder population in a broadband communication network.

For example, the transcoder apparatus 410 of FIG. 4 is shown having three individual transcoders 420, 425 and 430, where each transcoder has a corresponding post-pre-processing engine 422, 427, 432, respectively. Fewer or more transcoders may be used. Transcoder 1 (420) receives a corresponding pre-compressed bit stream having a first format (Format 1), while transcoder 2 (425) receives a pre-compressed bit stream having a second format (Format 2), and transcoder 3 (430) receives a pre-compressed bit stream having a third format (Format 3). The formats are assumed to be different from one another. The respective bit streams may also be provided to a master rate and format control engine 415, which can determine the format of the bit streams by reading the appropriate header information, although this is not generally required for noise reduction filtering.

The master rate and format control engine 415 communicates with the transcoders 420, 425 and 430 and the respective post-pre-processing engines 422, 425, 432 to send select signals to select one or more of the processing functions in the post-pre-processing engines. A user input may be provided for this purpose. As a result, it is possible to convert the bit streams to a common format, e.g., Format A. The converted bit streams, e.g., bit stream 1', 2' and 3', may be provided to a multiplexer (MUX) 435 to form a combined bit stream having the format A.

Figure 5:
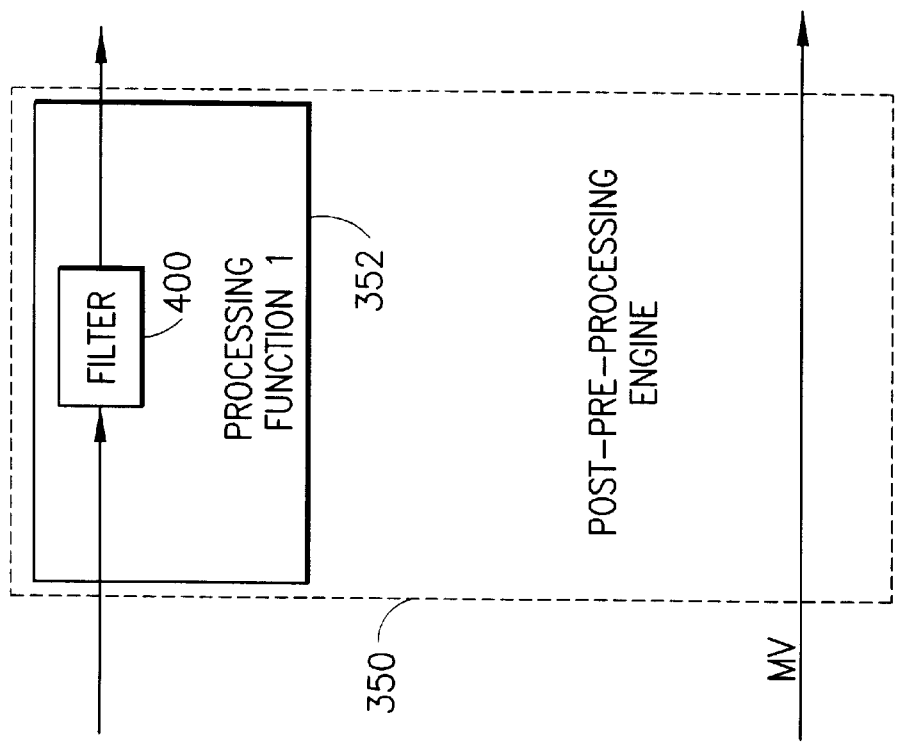
FIG. 5 illustrates a post-pre-processing engine with a first processing function for noise reduction/deblocking filtering of intermediate reconstructed frames in accordance with the present invention.

FIG. 5 illustrates a post-pre-processing engine for noise reduction/deblocking filtering of intermediate reconstructed frames in accordance with the present invention. For MPEG applications, sequence, picture, splice and macroblock (MB) head bits, and MVs can be copied into the new bitstream, with modifications as required.

Experiments have indicated that at low bit rates, it may be desirable to soften the picture prior to re-encoding. Accordingly, the post-pre-processing engine 350 may be provided with a low pass, or noise reduction filter 400 that can remove or attenuate unwanted high frequency information in the intermediate reconstructed frame.

Furthermore, MPEG video coding is a block coding technique. At low bit rates, the reconstructed video frames may show annoying block artifacts. The block artifacts are high frequency information, and hence require more bits to be re-encoded. An adaptive deblocking filter can significantly reduce block artifacts in the intermediate reconstructed frame, and therefore smooth/soften the block boundaries. Block artifacts are caused by spatial transformation and quantization of neighboring pixel blocks. By removing or reducing block artifacts, the re-encoder of the transcoder can allocate more bits for the more important low frequency information, thereby improving the quality of the resulting image.

The noise reduction/deblocking filter 400 may be selected from a variety of known filter types, including fixed or adaptive filters. Additionally, the filter may be 1-D (e.g., one dimensional), 2-D, or 3-D.

The noise reduction/deblocking filtering may be performed over the current reconstructed frame. Moreover, pixels in a current block may be filtered using future pixels in another block in the same frame, as discussed in connection with FIGS. 7(*a*) and 7(*b*) below.

Furthermore, the filter 400 can also be used for converting the video format from interlaced scan to progressive scan, or vice versa, using known processing techniques. This kind of filter will smooth the vertical transition between lines in a frame. The filtering may be performed over the temporal domain.

Figure 7A:
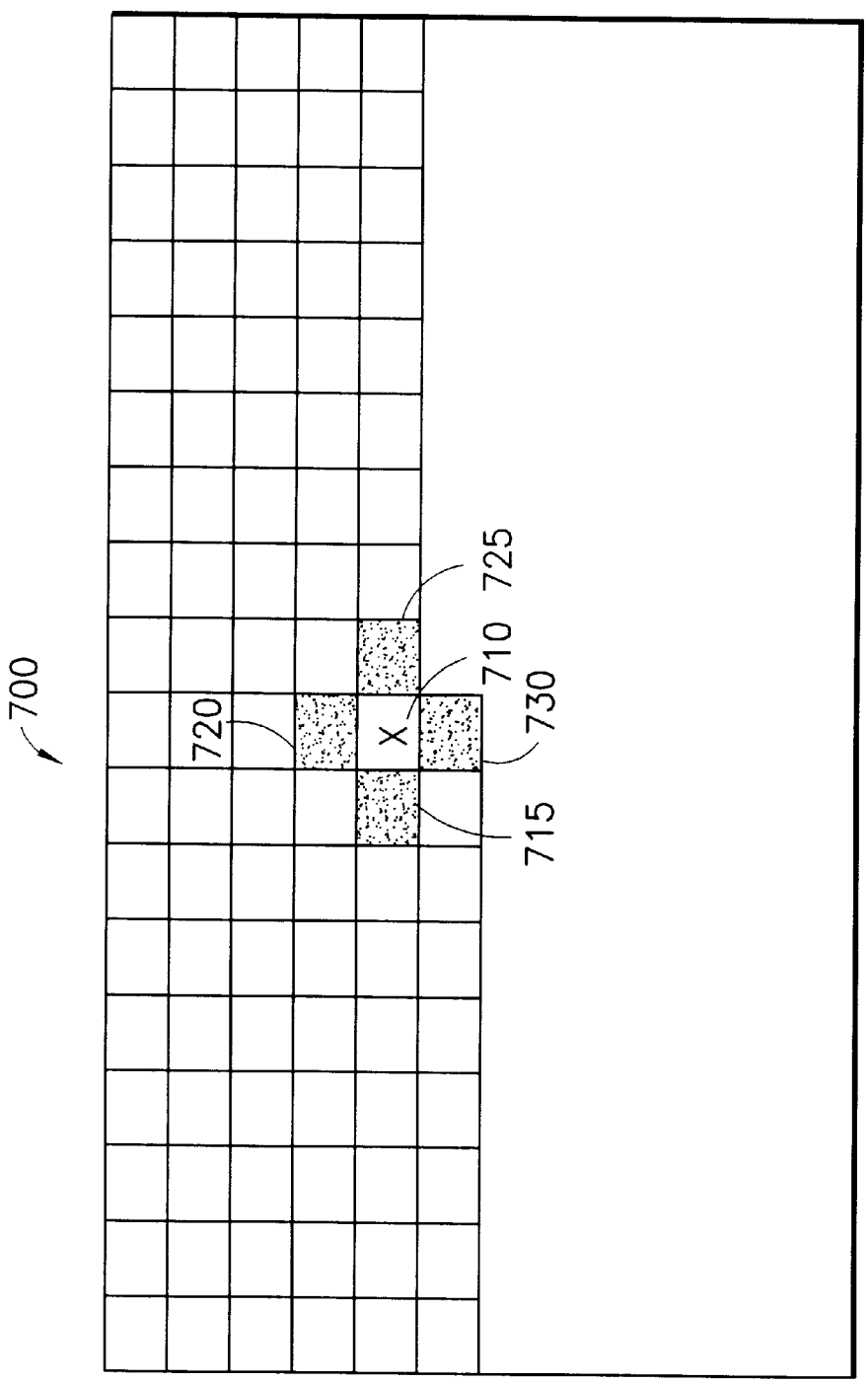
FIG. 7($a$) illustrates a filtering scheme for an intermediate reconstructed frame with the second processing function of FIG. 6 in accordance with the present invention.
Figure 7B:
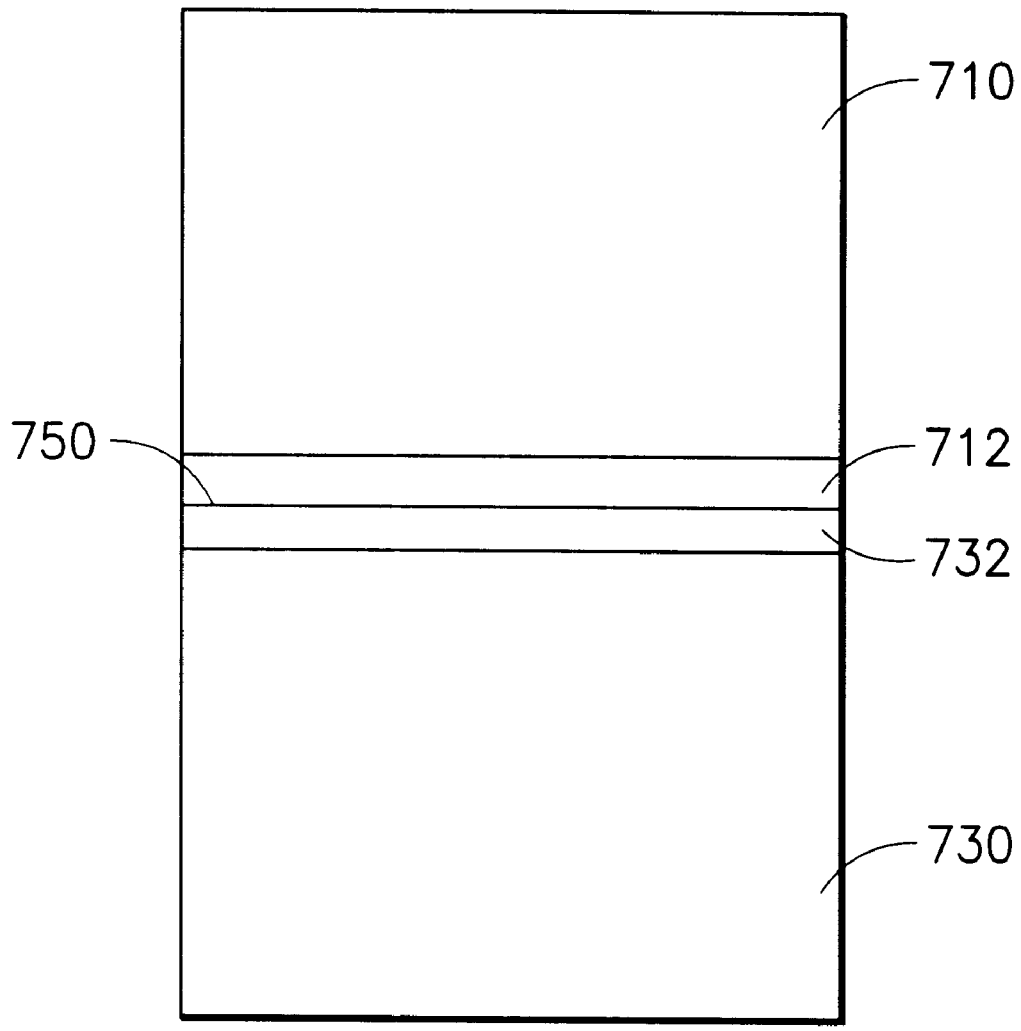

FIG. 7(*a*) illustrates a scheme for filtering of pixel blocks in a frame using neighboring blocks in accordance with the present invention. In an image area 700*a* block (e.g., macroblock) 710 has neighboring blocks 715, 720, 725 and 730. To reduce the noise in each current block, pixels near the edge region of the current block may be filtered according to a weighted average or other function of the edge region pixel values in a neighboring block (see FIG. 7(*b*)) and other pixel values in the current block.

Note that in the image 700, the display scan order is assumed to progress from the top to the bottom of the image, and from left to right in each pixel line. Therefore, blocks 725 and 730 are future blocks relative to the current pixel 710. Accordingly, a delay function 600 may be required, as shown in the post-pre-processing engine 350 of FIG. 6, to store the data from pixels 710, 715, 720 and 725, along with the intervening pixels, until pixel 730 is reached. Essentially, one full row of blocks is stored. Generally, the delay should not be beyond one block row.

FIG. 7(*b*) illustrates filtering of pixels in the current block of FIG. 7(*a*) using pixels in a neighboring block in accordance with the present invention. Like numbered elements correspond to those of FIG. 7(*a*). An imaginary boundary 750 separates the current block 710 and a following neighboring block 730. Here, pixels in a bottom row 712 of block 710 may be filtered using pixels in a top row 732 of block 730. The filtering for each pixel may extend over one or more pixels in each direction.

Figures 1, 8:
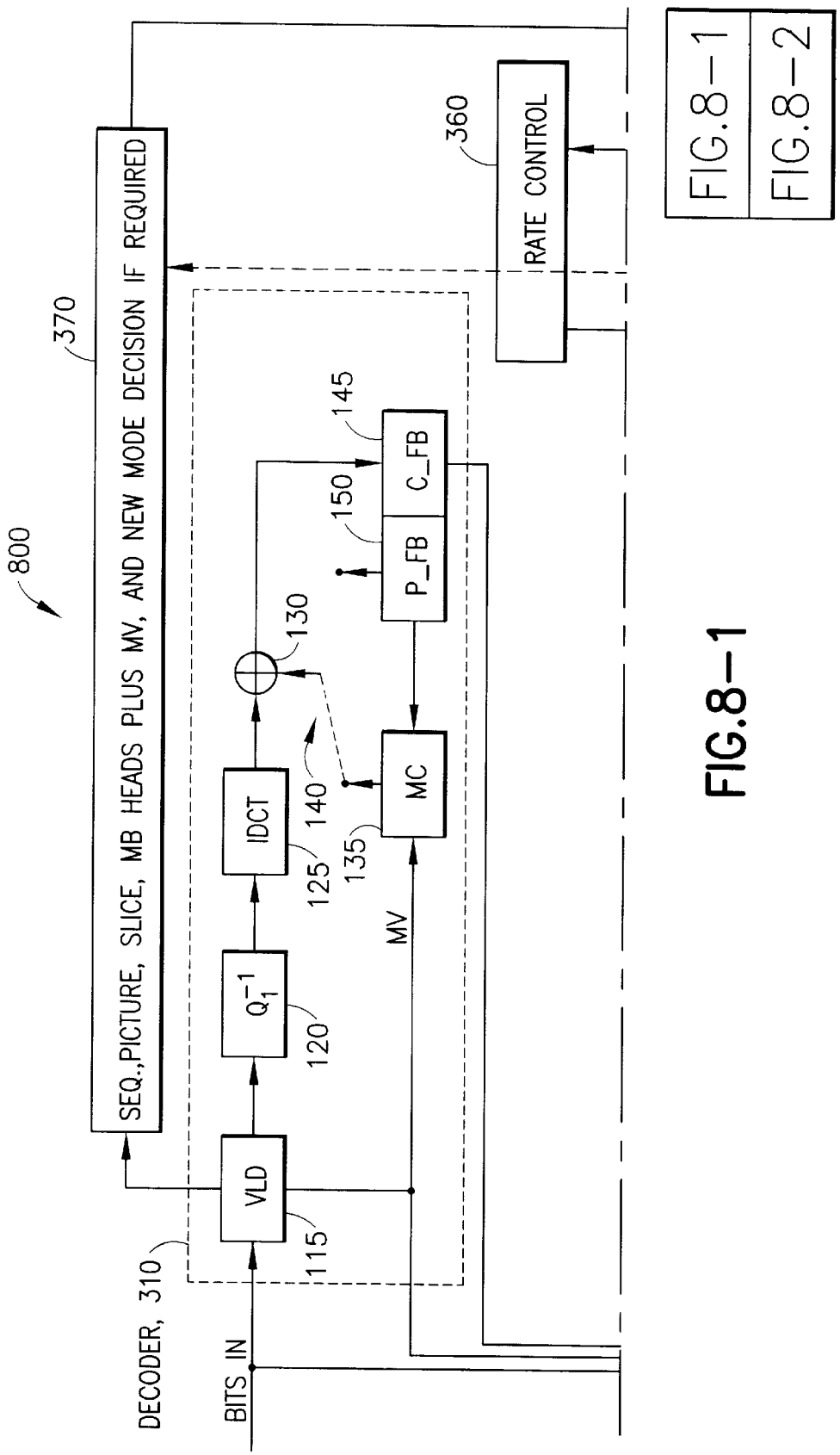
FIG. 8 illustrates a post-pre-processing engine with a third processing function for noise reduction filtering of intermediate reconstructed frames with a delay function, and down-sampling in accordance with the present invention.
Figures 2, 8:
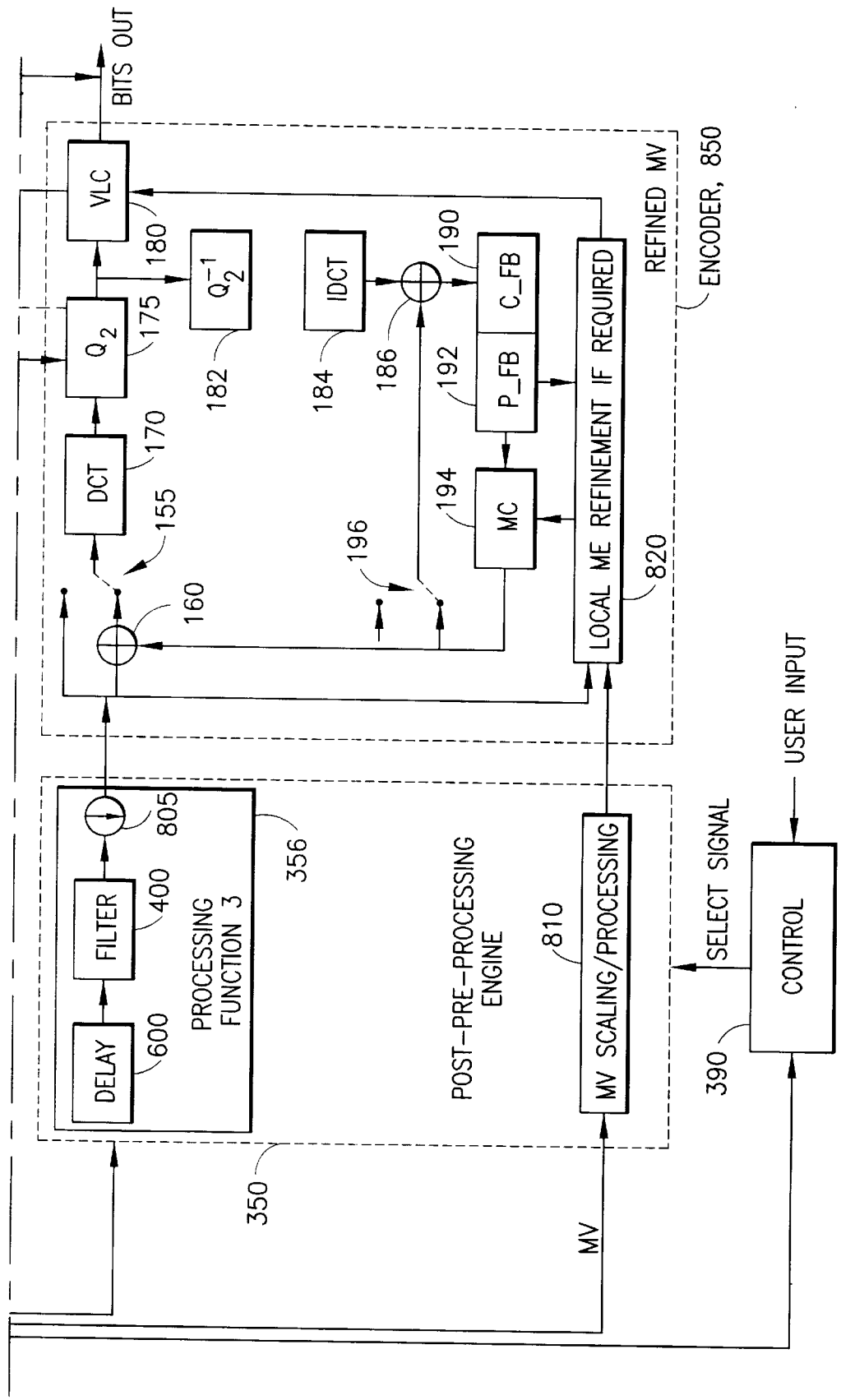

FIG. 8 illustrates a post-pre-processing engine with a third processing function for noise reduction filtering of intermediate reconstructed frames with a delay function, and down-sampling in accordance with the present invention. For a format conversion from high resolution to low resolution, a down sampling operation is added into the post-pre-processing engine 350. The transcoder 800 includes a decoder 310, and an encoder 850, where like-numbered elements correspond to those of the previous figures. Here, the post-pre-processing engine 350 includes a motion vector scaling/processing function 810, which reduces the length of the motion vectors in accordance with the reduction in the image size. The scaled motion vectors are provided from the function 810 to an optional motion estimation refinement function 820 at the encoder 850, which provides local refinement of the scaled motion vectors, if required.

Figure 6:
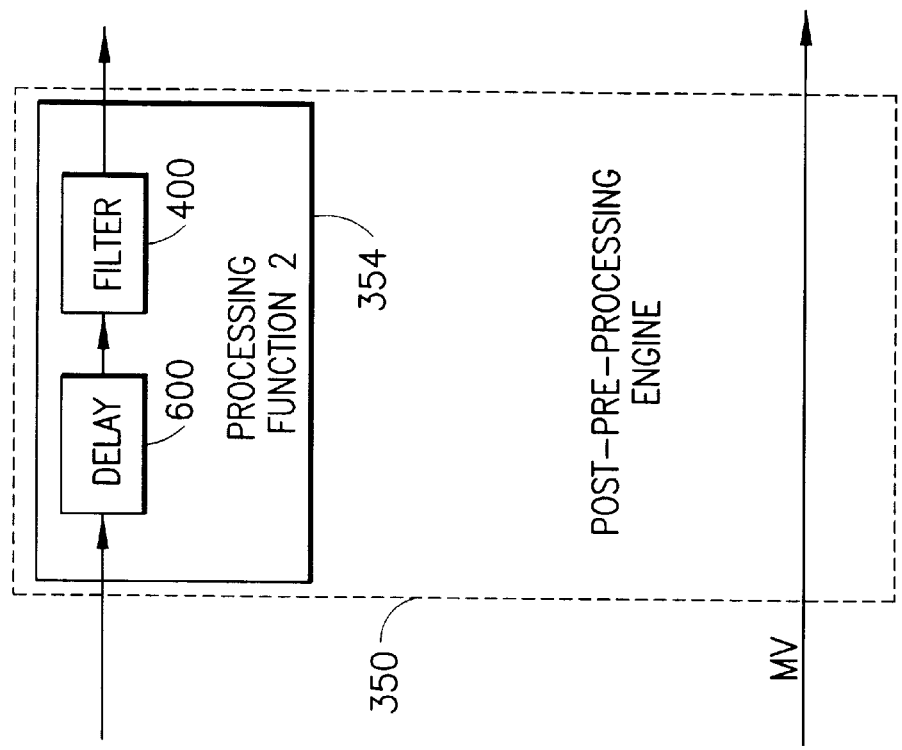
FIG. 6 illustrates a post-pre-processing engine with a second processing function for noise reduction filtering of intermediate reconstructed frames with a delay function in accordance with the present invention.

The processing function 356 corresponds to the processing function 354 of FIG. 6 but adds a down sampler 805.

Applications of the transcoder 800 include transcoding of a pre-compressed bitstream from a high spatial resolution to a low spatial resolution, e.g., from high-definition (HD) to standard-definition (SD), from SD to common intermediate format (CIF)/standard intermediate format (SIF), from CIF/SIF to quarter CIF (QCIF) or even smaller resolutions, or from a high color sampling ratio to a low color sampling ratio, e.g., from 4:4:4 to 4:2:2, or from 4:2:2 to 4:2:0.

Accordingly, it can be seen that the present invention provides a generic multi-functional transcoder architecture that converts one or more pre-compressed digital video bit streams into corresponding bit streams at a specific bit rate and format. A post-pre-processing engine in the transcoder provides a number of processing functions for implementing the desired format conversions according to a user selection signal or an automatically generated selection signal. Furthermore, the transcoder avoids the need for motion estimation.

The transcoder can handle pre-compressed digital video bit streams from a variety of sources and with a variety of formats. Moreover, a single generic transcoder type can be deployed in a network to handle a variety of formatting requirements, while the specific desired processing functions can be selected or revised at a later date.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with a cable or satellite television broadband communication networks, it will be appreciated that other networks such as local area networks (LANs), metropolitan area networks (MANs), wide area networks (WANs), internets, intranets, and the Internet may be used.

Additionally, the invention is compatible with digital video standards other than MPEG-2.

What is claimed is:

1. A method for transcoding compressed digital video data, comprising the steps of:

partially decompressing first compressed digital video data to provide first intermediate reconstructed data having an associated first format;

providing a post-pre-processing engine having a plurality of different available processing functions;

providing a first selection signal for selecting at least one of said processing functions;

processing said first intermediate reconstructed data according to said at least one selected processing function to provide corresponding first modified intermediate reconstructed data having a first modified format that is different than said first format; and compressing the first modified intermediate reconstructed data to provide first modified compressed digital video data with said first modified format.

2. The method of claim 1, comprising the further step of:

processing said first compressed digital video data to change a bit rate thereof according to a second selection signal.

3. The method of claim 1, wherein:

one of said plurality of different available processing functions processes said first intermediate reconstructed data with a noise-reduction filter.

4. The method of claim 3, wherein:

said noise reduction filter is one of a fixed filter and an adaptive filter.

5. The method of claim 1, wherein:

one of said plurality of different available processing functions delays at least a portion of said first intermediate reconstructed data to provide noise-reduction filtering of a current image region thereof using a future image region thereof.

6. The method of claim 5, wherein:

said current image region and said future image region are in a common video frame; and said future image region follows said current image region according to a display scan sequence of said first intermediate reconstructed data.

7. The method of claim 1, wherein:

one of said plurality of different available processing functions provides said first modified intermediate reconstructed data with a different resolution than a resolution of said first intermediate reconstructed data.

8. The method of claim 1, wherein:

one of said plurality of different available processing functions either (a) provides said first modified intermediate reconstructed data with an interlaced scan format when said first intermediate reconstructed data has a progressive scan format, or (b) provides said first modified intermediate reconstructed data with a progressive scan format when said first intermediate reconstructed data has an interlaced scan format.

9. The method of claim 1, wherein:

one of said plurality of different available processing functions provides said first modified intermediate reconstructed data with a color space sampling format that is different than a color space sampling format of said first intermediate reconstructed data.

10. The method of claim 1, wherein:

one of said plurality of different available processing functions provides said first modified intermediate reconstructed data with a frame rate that is different than a frame rate of said first intermediate reconstructed data.

11. The method of claim 1, wherein:

one of said plurality of different available processing functions provides said first modified intermediate reconstructed data with a frame size that is different than a frame size of said first intermediate reconstructed data.

12. The method of claim 1, wherein:

said selection signal is user-designated.

13. The method of claim 1, wherein:

said selection signal is generated by a control in response to a detected characteristic of said first compressed digital video data.

14. The method of claim 1, wherein:

said post-pre-processing engine is provided in a broadband communication network.

15. The method of claim 1, wherein said method is adapted for transcoding a plurality of bit streams of compressed digital video data, comprising the further steps of:

partially decompressing second compressed digital video data to provide second intermediate reconstructed data having a second format that is different than said first format;

providing a second post-pre-processing engine having an associated plurality of different available processing functions;

providing a second selection signal for selecting at least one of said processing functions of said second post-pre-processing engine;

processing said second intermediate reconstructed data according to said at least one selected processing function of said second post-pre-processing engine to provide corresponding second modified intermediate reconstructed data having said first modified format; and compressing the second modified intermediate reconstructed data to provide second modified compressed digital video data with said first modified format.

16. The method of claim 1, comprising the further steps of:

obtaining motion vector data from said first intermediate reconstructed data; and providing said motion vector data for use in compressing the first modified intermediate reconstructed data; wherein:

said motion vector data is refined as required for use in said compressing step.

17. An apparatus for transcoding compressed digital video data, comprising:

means for partially decompressing first compressed digital video data to provide first intermediate reconstructed data having an associated first format;

a post-pre-processing engine having a plurality of different available processing functions;

means for providing a first selection signal for selecting at least one of said processing functions;

wherein said post-pre-processing engine processes said first intermediate reconstructed data according to said at least one selected processing function to provide corresponding first modified intermediate reconstructed data having a first modified format that is different than said first format; and means for compressing the first modified intermediate reconstructed data to provide first modified compressed digital video data with said first modified format.

18. The apparatus of claim 17, further comprising:

means for processing said first compressed digital video data to change a bit rate thereof according to a second selection signal.

19. The apparatus of claim 17, wherein:

said post-pre-processing engine comprises a noise-reduction filter for processing said first intermediate reconstructed data.

20. The apparatus of claim 19, wherein:
said noise reduction filter is one of a fixed filter and an adaptive filter.

21. The apparatus of claim 17, wherein:
said post-pre-processing engine comprises a delay associated with said noise-reduction filter for delaying at least a portion of said first intermediate reconstructed data to provide noise-reduction filtering of a current image region thereof using a future image region thereof.

22. The apparatus of claim 21, wherein:
said current image region and said future image region are in a common video frame; and
said future image region follows said current image region according to a display scan sequence of said first intermediate reconstructed data.

23. The apparatus of claim 17, wherein:
said post-pre-processing engine provides said first modified intermediate reconstructed data with a different resolution than a resolution of said first intermediate reconstructed data.

24. The apparatus of claim 17, wherein:
said post-pre-processing engine either (a) provides said first modified intermediate reconstructed data with an interlaced scan format when said first intermediate reconstructed data has a progressive scan format, or (b) provides said first modified intermediate reconstructed data with a progressive scan format when said first intermediate reconstructed data has an interlaced scan format.

25. The apparatus of claim 17, wherein:
said post-pre-processing engine provides said first modified intermediate reconstructed data with a color space sampling format that is different than a color space sampling format of said first intermediate reconstructed data.

26. The apparatus of claim 17, wherein:
said post-pre-processing engine provides said first modified intermediate reconstructed data with a frame rate that is different than a frame rate of said first intermediate reconstructed data.

27. The apparatus of claim 17, wherein:
said post-pre-processing engine provides said first modified intermediate reconstructed data with a frame size that is different than a frame size of said first intermediate reconstructed data.

28. The apparatus of claim 17, wherein:
said selection signal is user-designated.

29. The apparatus of claim 17, further comprising:
a control for generating said selection signal in response to a detected characteristic of said first compressed digital video data.

30. The apparatus of claim 17, wherein:
said post-pre-processing engine is provided in a broadband communication network.

31. The apparatus of claim 17, wherein said apparatus is adapted for transcoding a plurality of bit streams of compressed digital video data, further comprising:
means for partially decompressing second compressed digital video data to provide second intermediate reconstructed data having an associated second format that is different than said first format;
a second post-pre-processing engine having an associated plurality of different available processing functions;
means for providing a second selection signal for selecting at least one of said processing functions of said second post-pre-processing engine;
wherein said second post-pre-processing engine processes said second intermediate reconstructed data according to said at least one selected processing function of said second post-pre-processing engine to provide corresponding second modified intermediate reconstructed data having said first modified format; and
means for compressing the second modified intermediate reconstructed data to provide second modified compressed digital video data with said first modified format.

32. The apparatus of claim 17, further comprising:
means for obtaining motion vector data from said first intermediate reconstructed data; and
means for providing said motion vector data for use by said compressing means in compressing the first modified intermediate reconstructed data; and
means for refining said motion vector data as required for use by said compressing means.

33. A method for transcoding first compressed digital video data, comprising the steps of:
partially decompressing the first compressed digital video data to provide first intermediate reconstructed data having an associated first format;
providing a post-pre-processing engine having a plurality of different available processing functions; providing a selection signal for selecting at least one of said processing functions;
processing said first intermediate reconstructed data according to said at least one selected processing function to provide corresponding first modified intermediate reconstructed data having a first modified format that is different than said first format; and
compressing the first modified intermediate reconstructed data to provide first modified compressed digital video data with said first modified format; wherein:
said plurality of different available processing functions perform at least one of:
(a) processing said first intermediate reconstructed data with a noise-reduction filter;
(b) providing said first modified intermediate reconstructed data with a different resolution than a resolution of said first intermediate reconstructed data;
(c) providing said first modified intermediate reconstructed data with an interlaced scan format when said first intermediate reconstructed data has a progressive scan format;
(d) providing said first modified intermediate reconstructed data with a progressive scan format when said first intermediate reconstructed data has an interlaced scan format;
(e) providing said first modified intermediate reconstructed data with a color space sampling format that is different than a color space sampling format of said first intermediate reconstructed data;
(f) providing said first modified intermediate reconstructed data with a frame rate that is different than a frame rate of said first intermediate reconstructed data; and
(g) providing said first modified intermediate reconstructed data with a frame size that is different than a frame size of said first intermediate reconstructed data.

34. An apparatus for transcoding first compressed digital video data, comprising:
means for partially decompressing the first compressed digital video data to provide first intermediate reconstructed data having an associated first format;

a post-pre-processing engine having a plurality of different available processing functions;

means for providing a selection signal for selecting at least one of said processing functions;

wherein said post-pre-processing engine processes said first intermediate reconstructed data according to said at least one selected processing function to provide corresponding first modified intermediate reconstructed data having a first modified format that is different than said first format; and means for compressing the first modified intermediate reconstructed data to provide first modified compressed digital video data with said first modified format; wherein:

said plurality of different available processing functions perform at least one of:
  (a) processing said first intermediate reconstructed data with a noise-reduction filter;
  (b) providing said first modified intermediate reconstructed data with a different resolution than a resolution of said first intermediate reconstructed data;
  (c) providing said first modified intermediate reconstructed data with an interlaced scan format when said first intermediate reconstructed data has a progressive scan format;
  (d) providing said first modified intermediate reconstructed data with a progressive scan format when said first intermediate reconstructed data has an interlaced scan format;
  (e) providing said first modified intermediate reconstructed data with a color space sampling format that is different than a color space sampling format of said first intermediate reconstructed data;
  (f) providing said first modified intermediate reconstructed data with a frame rate that is different than a frame rate of said first intermediate reconstructed data; and
  (g) providing said first modified intermediate reconstructed data with a frame size that is different than a frame size of said first intermediate reconstructed data.

* * * * *